(12) United States Patent
Vikberg et al.

(10) Patent No.: US 8,477,720 B2
(45) Date of Patent: Jul. 2, 2013

(54) MOBILITY FOR IMS USERS

(75) Inventors: Jari Vikberg, Järna (SE); Tomas Nylander, Värmdö (SE); Magnus Hallenstål, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 890 days.

(21) Appl. No.: 12/445,664

(22) PCT Filed: Oct. 16, 2006

(86) PCT No.: PCT/EP2006/067468
§ 371 (c)(1),
(2), (4) Date: Nov. 24, 2009

(87) PCT Pub. No.: WO2008/046445
PCT Pub. Date: Apr. 24, 2008

(65) Prior Publication Data
US 2010/0189072 A1 Jul. 29, 2010

(51) Int. Cl.
*H04W 4/00* (2009.01)
*H04L 12/66* (2006.01)
*H04L 12/28* (2006.01)

(52) U.S. Cl.
USPC ....... 370/331; 370/338; 370/352; 370/395.21

(58) Field of Classification Search
USPC .................................... 370/331, 338, 395.21
See application file for complete search history.

(56) References Cited

U.S. PATENT DOCUMENTS

| | | | |
|---|---|---|---|
| 6,980,801 | B1 | 12/2005 | Soininen et al. |
| 8,203,982 | B2 * | 6/2012 | Mutikainen et al. ......... 370/310 |
| 8,316,457 | B1 * | 11/2012 | Paczkowski et al. ........... 726/27 |
| 2002/0087674 | A1 | 7/2002 | Guilford et al. |
| 2006/0114871 | A1 | 6/2006 | Buckley et al. |
| 2006/0239229 | A1 * | 10/2006 | Marinescu et al. .......... 370/331 |
| 2008/0057892 | A1 * | 3/2008 | Taaghol .................... 455/187.1 |
| 2008/0080480 | A1 * | 4/2008 | Buckley et al. .............. 370/352 |
| 2008/0267171 | A1 * | 10/2008 | Buckley et al. .............. 370/352 |
| 2009/0029703 | A1 * | 1/2009 | Turnbull et al. .............. 455/436 |

FOREIGN PATENT DOCUMENTS

| | | |
|---|---|---|
| CN | 1 809 036 A | 7/2007 |
| EP | 2 026 533 A1 | 2/2009 |

(Continued)

OTHER PUBLICATIONS

Latvakoski E J et al: "Application based access system selection concept for all IP mobile terminals" GLOBECOM'02. 2002—IEEE Global Telecommunications Conference. Conference Proceedings. Taipei, Taiwan, Nov. 17-21, 2002, IEEE Global Telecommunications Conference, New York, NY: IEEE, US, vol. vol. 1 of 3, pp. 2984-2988, XP010636293 ISBN: 0-7803-7632-3.

*Primary Examiner* — Brandon Renner (57) ABSTRACT

A method, server, and terminal for selecting an access domain for sending information between a wireless terminal and a core network, wherein sessions between the wireless terminal and the core network are established and controlled using an IP Multimedia Subsystem (IMS). A database maintained in the IMS stores information regarding real-time packet-switched service capabilities of a plurality of access domains. The database is interrogated based upon currently used and/or available access domains. An access domain is selected for use by the wireless terminal based upon the results of the interrogation.

14 Claims, 5 Drawing Sheets

FOREIGN PATENT DOCUMENTS

| | | |
|---|---|---|
| GB | 2398 458 A | 8/2004 |
| WO | WO 2005/064958 A | 7/2005 |
| WO | WO 2006/037375 A1 | 4/2006 |
| WO | WO 2006/056069 A | 6/2006 |

* cited by examiner

MOBILITY FOR IMS USERS

FIELD OF THE INVENTION

The invention relates to mobility for IP Multimedia Subsystem (IMS) users. In particular, though not necessarily, it relates to providing information relating to handover capabilities to user terminals to enable the terminals or users to make an informed decision regarding registering with a particular access domain.

BACKGROUND

IP Multimedia (IPMM) is an example of a service that provides a dynamic combination of voice, video, messaging, data, etc, within the same session. By growing the numbers of basic applications and the media which it is possible to combine, the number of services offered to the end users will grow, and the interpersonal communication experience will be enriched. This will lead to a new generation of personalised, rich multimedia communication services, e.g. peer-to-peer multimedia communication, IPTV etc.

These services can be based on the IP Multimedia Subsystem (IMS) architecture, which is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7).

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Other multimedia applications which can be used for media transmission and control include Real-time Transport Protocol and Real-time Transport Control Protocol (RTP/RTCP), Message Session Relay Protocol (MSRP), and Hyper Text Transfer Protocol (HTTP).

Figure 1:
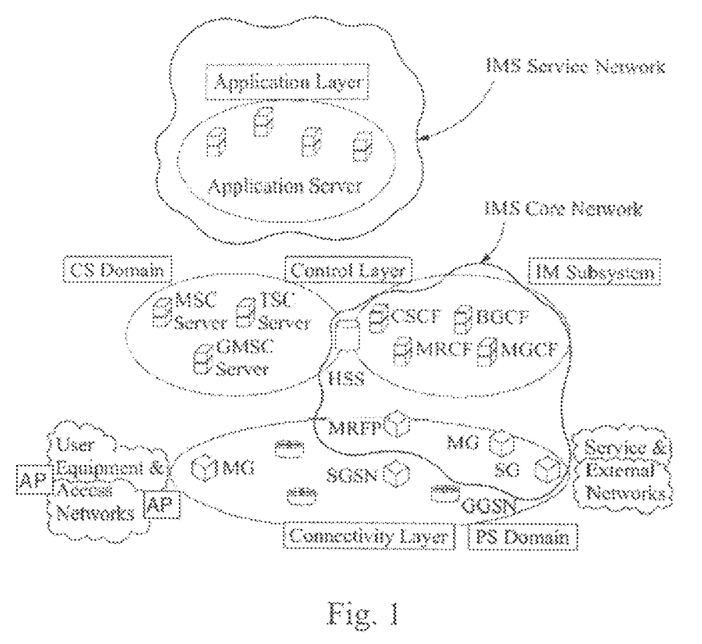
FIG. 1 illustrates schematically the integration of an IP Multimedia Subsystem into a 3G mobile communications system.

FIG. 1 illustrates schematically how the IMS fits into the mobile network architecture in the case of a 3GPP PS access domain.

Call Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A fundamental requirement for real-time service provision is the seamless handover of services for subscribers moving across cell boundaries of the radio access network (RAN) or subscribers moving across RAN or radio access technology (RAT) boundaries (e.g. moving between 2G, 3G and/or LTE networks). [The term 'access domain' will be used throughout to refer generally to any access network or access technology that the subscriber is moving across]. Traditional circuit switched (CS) based call services have been designed to meet this requirement. In the case of 2G and currently implemented 3G networks, packet switched (PS) real time handover (HO) with low latency is not provided for, although service continuity is achieved at the terminal side by ordering a session to be moved from one cell to the other, i.e. there is no prepare phase to shorten latency when moving between cells. Real time PS handover is standardized in 3GPP for 3G networks, but the feature has not yet been deployed. It is expected that when High-Speed Downlink Packet Access (HSDPA) is deployed, or shortly thereafter, the mechanisms needed for fast PS handover will also be deployed. For 2G networks, fast and efficient PS handover procedures in the packet switched (PS) domain have only recently been standardized in 3GPP TS 43.129, and in the initial implementation stage, roll-out of this feature across 2G networks will inevitably be patchy. In addition, support for PS handover in 2G networks such as GSM/GPRS networks is never likely to be comprehensive (if implemented at all), yet handover of PS calls would be desirable as 2G networks will continue to provide a fallback network for 3G subscribers in the case of limited 3G network coverage. It can also be expected that the next generation radio and core networks which are currently being specified under the names LTE (Long Term Evolution) and SAE (System Architecture Evolution) in 3GPP will also have limited coverage, and that these networks will also require fallback to 3G and 2G networks.

It is expected that in the future all peer-to-peer multimedia communications in the mobile network will run over the PS domain. In particular, as voice calls are just a special variant of peer-to-peer multimedia communication, all voice calls will be Voice-over-IP (VoIP) calls. VoIP calls will be particularly sensitive to even relatively minor service interruptions caused by inter-cell handovers. As long as a terminal engaged in a VoIP call can perform PS handover to another cell (the "target cell"), the interruption can be kept short enough to avoid any noticeable drop in perceived quality. However, if either the current cell (the "source cell") or the target cell do not support PS handover, a noticeable interruption is likely to occur as packets will be lost or delayed during the transition period. Consequently, until all network technologies and all RAN cells support PS handover, the provision of IMS services such as voice and video calls utilising the PS domain is likely to result in users receiving a reduced quality of service when crossing cell boundaries.

International patent application number PCT/EP04/053333 describes a process for allowing the IMS to automatically establish a call over a CS network when a user requests the IMS call using signalling sent to the IMS over a PS network. In this way, the IMS ensures that the appropriate Quality of Service (QoS) is applied to the call. In addition, the IMS call using CS network will benefit from the seamless handovers afforded by the CS domain, if and when the user is handed over to a neighbouring cell. The procedure involves the establishment of a first CS leg between the terminal and the CS core network (terminating at a responsible Mobile Switching Centre (MSC)), and a second CS leg between the IMS and the MSC in order to link the CS access domain leg to the IMS. This is achieved using an inter MSC handover procedure, with the responsible entity within the IMS acting as an "anchor" MSC.

A potential disadvantage associated with the above proposal is that a VoIP call is automatically carried over the CS network even if the PS network is able to provide roaming and a satisfactory QoS for the call. In addition, the process of transferring the call to the CS network will consume significant resources within the network and, where the PS network can support the call, this will be wasted effort.

A possible solution to this problem is to include in system information messages, sent on a broadcast channel of the radio network, an indication of the level of support within the network for PS handover. This indication can be used by a wireless terminal to decide how to attach to a currently visited access network. However, for this to work efficiently, all networks must support the broadcasting of the appropriate system information. [Of course, where the PS access domain is operated by the user's home network, the IMS will have knowledge of the handover capabilities of the access domain.]

SUMMARY

According to a first aspect of the present invention there is provided a method of selecting an access domain for sending information between a wireless terminal and a core network, sessions between the wireless terminal and the core network being established and controlled using an IP Multimedia Subsystem, the method comprising:
  maintaining within the IP Multimedia Subsystem a database holding information on real-time packet-switched service capabilities of a plurality of access domains; and
  interrogating said database based upon currently used and/or available access domains and selecting an access domain for use by the wireless terminal based upon the results of the interrogation.

Embodiments of the present invention enable the IMS or a user/wireless terminal to select an access domain appropriate for real time services such as voice calling. The method is applicable in particular where access networks do not broadcast the real time capabilities of their access domains.

In a preferred embodiment, interrogation is initiated by the wireless terminal. This may happen at IMS registration, where the SIP REGISTER message sent by the terminal to the IP Multimedia Subsystem identifies the packet switched domains available to the terminal. The SIP REGISTER message may identify a current network and cell of the wireless terminal, and the simultaneous circuit switched and packet switched session capabilities of the wireless terminal.

Alternatively, interrogation is initiated subsequent to IP Multimedia Subsystem registration of the terminal. A SIP OPTIONS message sent by the terminal to the IP Multimedia Subsystem may identify the packet switched domains available to the terminal. The SIP OPTIONS message may identify a current location of the wireless terminal, and the simultaneous circuit switched and packet switched session capabilities of the wireless terminal.

The selected access domain may be indicated to the wireless terminal in a SIP 200 OK response.

The IP Multimedia Subsystem may signal to the wireless terminal a requirement for the terminal to:
  remain registered to all IP Multimedia Subsystem services via a current packet switched access domain and not to register to a circuit switched access domain;
  remain registered only for non-realtime IP Multimedia Subsystem services in the current packet switched access domain and to also register to a circuit access domain; or
  register with another packet switched access domain.

According to a second aspect of the present invention there is provided an application server for use in an IP Multimedia Subsystem, the application server comprising:
  a memory maintaining a database holding information on real-time packet-switched service capabilities of a plurality of access domains;
  input means for receiving a query from another IP Multimedia Subsystem server containing the identifies of packet switched access domains available to the wireless terminal; and
  output means for returning to the enquiring server the capabilities of the identified access domains or a selected access domain.

According to a third aspect of the present invention there is provided a wireless terminal for use in a cellular network, the terminal comprising:
  means for identifying available packet switched access domains;
  means for sending a notification to an IP Multimedia Subsystem, the notification identifying the available packet switched access domains;
  means for receiving from the IP Multimedia Subsystem a response identifying a selected one of the identified packet switched access domains.

According to a fourth aspect of the present invention there is provided method of operating an application server responsible for real time services within an IP Multimedia Subsystem, the method comprising:
  recording at the application server, explicitly and/or implicitly, the availability of packet switched and circuit switched access for associated user terminals;
  receiving a terminating session establishment request in respect of one of said user terminals;
  determining whether or not the received request relates to one of a class of real time services, and selecting one or both of a packet switched and circuit switched access for completing the session based upon the determined class and the access availability.

One of said real time services may be voice calling, the method comprising, when it is determined that the received request relates to a voice call, determining whether or not a suitable packet switched access is available and, if not, selecting a circuit switched access to complete the call. A roaming number may be obtained for the user terminal to which the request relates, from a Home Subscriber Server.

DETAILED DESCRIPTION OF CERTAIN EMBODIMENTS

As discussed above, a possible mechanism for providing information to a wireless terminal relating to support for packet switched (PS) handover in the available access domain is to broadcast that information in system information messages. However, in the event that this is not done, or only certain available networks/technologies broadcast the information, a fallback mechanism is required.

Figure 2:
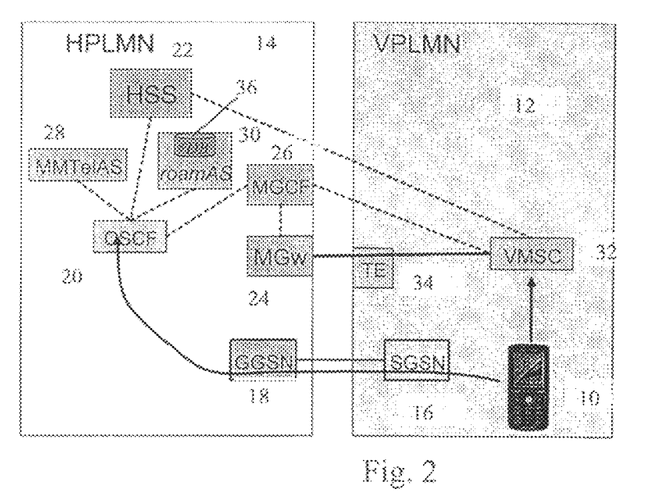
FIG. 2 illustrates the relationship and interfaces between a wireless terminal's home network (HPLMN) and a currently used network (VPLMN)

With reference to FIG. 2, there is illustrated a wireless (user) terminal or mobile station (MS) 10 that is roaming into a visited public land mobile network (VPLMN) 12, shown on the right hand side, the VPLMN 12 being in communication with a home public land mobile network (HPLMN) 14 of the MS 10, shown on the left hand side. The VPLMN 12 will offer a Circuit Switched (CS) access technology, as well as possibly both 2G and 3G PS access technologies. Future network architectures may provide a still further PS access technology (e.g. SAE/LTE and even WLAN). It will be appreciated that as well as the illustrated PLMN, the MS 10 may be within range of one or more other PLMNs which offer competing CS and PS access services.

PS services are facilitated by a Serving GPRS Support Node (SGSN) 16 in the VPLMN 12 and a Gateway GPRS Support Node (GGSN) 18 in the HPLMN 14. [In 3GPP SAE/LTE the current standard's view is that the PS service will be facilitated by a so-called aGW (access GateWay)]. For 2G and 3G networks, the GGSN 18 is coupled to the IMS core network.

The HPLMN core network includes the CSCFs 20, the Home Subscriber Server (HSS) 22 and IMS control components such as the IMS Media Gateway Function (MGw) 24 and Media Gateway Control Function (MGCF) 26. A variety of Application Servers (AS) can interface with the S-CSCF using the Session Initiation Protocol (SIP). In particular, an application server 28 known as the MMTelAS (Multimedia Telephony Application Server) is responsible for handling telephony services within the IMS, e.g. voice calls. The IMS gateway control functions link to a visited mobile switching centre (VMSC) 32 of the visited access network 12 which is responsible for CS calls in the currently visited network. [The designation "TE" 34 in FIG. 2 identifies a Transit Exchange.]

A new AS 30 referred to here as the roamAS (Roaming Application Server) is also incorporated into the IMS. The purpose of the roamAS is to maintain a record of the PS handover capabilities of all visited PLMNs 12 (known to the HPLMN 14). To this end, it maintains a database 36 holding this information. Optionally, the roamAS also maintains the simultaneous CS and PS session capabilities of these networks 12. This may be enabled with DTM (Dual Transfer Mode) which is a mechanism provided in some 2G networks to enable simultaneous PS and CS sessions. In 3G networks simultaneous PS and CS sessions can be supported with combinational radio access bearers. For reasons of brevity, the term DTM is used in the accompanying Figures to indicate "support of simultaneous CS and PS sessions" and is as such not limited to 2G networks only. The database may also contain other relevant information about the visited network, such as Radio Access Technology, e.g. 2G, 3G, LTE or combinations, coverage across a geographical area, roaming costs etc. Whilst the database 36 is shown as part of the roamAS 30, the database may be a separate entity, or may be part of the HSS 22, S-CSCF or another AS.

In order to access services facilitated by the IMS whilst roaming, the MS 10 must register with the IMS by sending a Session Initiation Protocol (SIP) REGISTER request to the IMS (routed via a P-CSCF and I-CSCF to an allocated S-CSCF). Of course, this assumes that the MS 10 has first registered with the VPLMN 12 and has access to a PS access technology of the VPLMN 12.

Figure 3A:
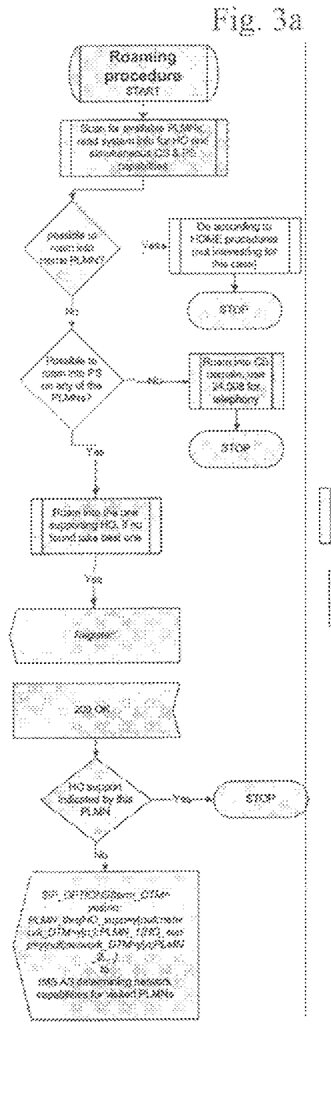
FIG. 3a is a schematic view of the wireless terminal's roaming procedure.

FIG. 3a is a flow diagram illustrating a process carried out by the MS 10 prior to first registration with an access domain and potentially thereafter. First the MS 10 scans the radio interfaces to see which access domains 12, 14 are available. If the HPLMN 14 is available, then the MS 10 functions as normal. If the HPLMN 14 is not available, the MS 10 checks whether any of the detected PS access domain support PS handover in the whole of the operator's network, using information that is contained within any broadcast system information messages. [The MS may also look for PS access domain that support handover across only a part of the network, if that is sufficient for the MS 10.] If such a network is found, the MS 10 firstly starts to register to the PS domain of that network and then secondly to the IMS using the PS domain of that network. If no network is found that supports PS handover in the whole of the operator's network, or the broadcast system information messages are not implemented by all or some of the operators' networks, the MS 10 will roam into the access domain with best radio signal strength and initiate SIP registration to the IMS.

In the event that the MS 10 performed IMS registration based upon no or only partial information on the PS handover capabilities of the available PS networks/technologies, the MS 10 sends a SIP OPTIONS message to the IMS to find out the capabilities of the visited PLMN 12 that it is currently using. This message contains the network identity of the used access domain (and possibly the current cell identifier). The MS 10 may also include in the message information about other/all detected networks (and possibly also identifiers of detected cells), as well as an indication about its own simultaneous CS and PS session capabilities.

When the SIP OPTIONS message is received by the S-CSCF, it forwards the message to the roamAS 30. The roamAS consults the database 36 which has all relevant capabilities (PS handover capabilities, simultaneous CS and PS session capabilities, etc.) of the available PS networks, and returns these capabilities to the MS 10 via the S-CSCF in the 200 OK response. The MS 10 can then decide whether or not to remain with the current PS domain 12 or switch to another PS access domain and/or to decide whether it should also perform CS registration (i.e. perform a Location Updating procedure towards the MSC in the currently used access domain or another access domain).

Figure 3B:
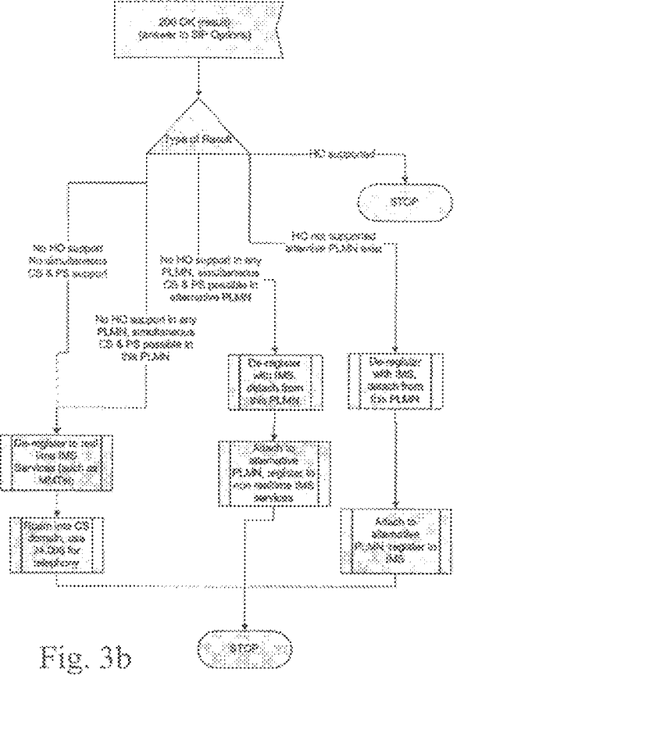
FIG. 3b is a schematic view of receipt of the SIP 200 OK in response to the SIP OPTIONS method at the wireless terminal.

As illustrated in the flow diagram of FIG. 3b, five different scenarios (i. to v.) may arise at the MS 10 upon receipt of the SIP 200 OK response.

i. The information held by the database 36 indicates support for real time PS services in the current PS access domain, including PS handover, bandwidth, QoS, etc.
   The roamAS 30 interprets and processes information provided by the database 36 and responds to the MS 10 with a 200 OK SIP response message containing "PS HO supported" (or similar). The MS 10 will, at receipt, know that all PS services should be supported in the currently used access domain 12. The MS 10 remains registered with the currently used PS access domain and with the IMS.

Figure 4:
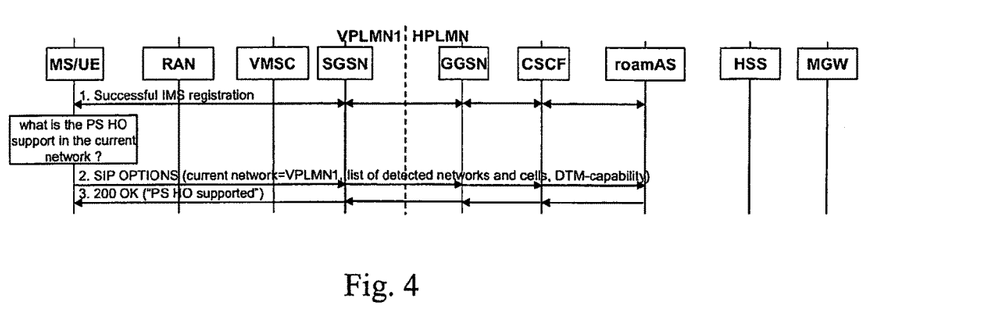
FIG. 4 is a signalling diagram illustrating signalling associated with registering with an IMS, when support for real-time PS services is available in the currently used network.

Signalling associated with this procedure is illustrated in FIG. 4, where VPLMN 1 is the current PS access domain.

ii. The information held by the database 36 indicates no support for real time PS services in the current access domain, but indicates that another detected PS network does support real time PS services.

The roamAS 30 will respond to the MS 10 with a 200 OK SIP response message containing "no PS HO supported" (or similar), and "alternative PLMN code". If the list of detected networks was included in the SIP OPTIONS message sent by the MS, the roamAS 30 uses it in the decision process when finding an alternative access domain.

The MS 10 will, at receipt of the 200 OK message with the indication about "alternative PLMN code" (and possibly also an indication of the relevant radio access technology (RAT)), check if the alternative PLMN is available in the current location. If available, the MS 10 de-registers from the IMS, detaches from the currently used PLMN 12, then attaches to the alternative PLMN, and re-registers to the IMS.

If the alternative PS access domain identified in the 200 OK response is not available in the current location, the MS 10 can perform CS domain registration (normal location update) to the current PLMN. The MS 10 can also remember the alternative PLMN, and periodically search for it and, once found, it can perform the steps listed above (de-register, detach, attach and re-register).

Figure 5:
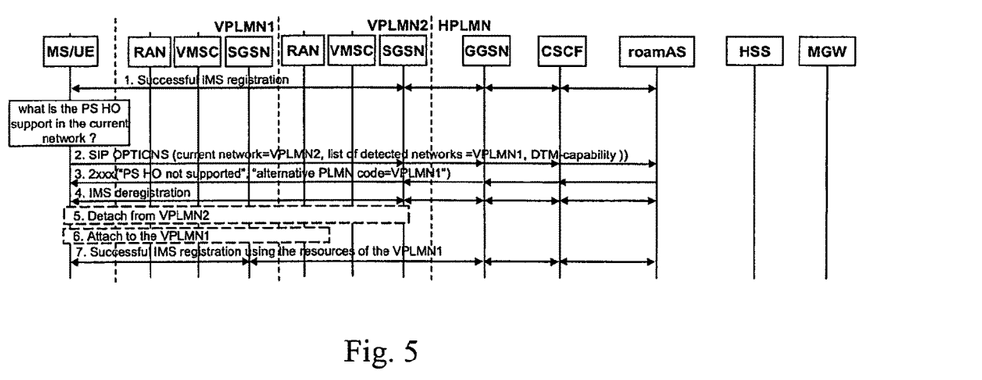
FIG. 5 is a signalling diagram illustrating signalling associated with registering with an IMS, when no support for real-time PS services is available in the currently used network, but a detected network does supports real-time PS services.

Signalling associated with this procedure is illustrated in FIG. 5, where the currently used PS access domain is designated VPLMN2 and the alternative network is designated VPLMN1.

iii. The information held by the database 36 indicates no support for real time PS services in the currently used PS access domain or in any of the detected networks, but indicates that the current PLMN and the MS both support simultaneous PS and CS sessions.

The roamAS 30 will respond to the MS with a 200 OK SIP response message containing "PS HO not supported, but simultaneous PS and CS sessions possible" (or similar). The MS 10 will, at receipt, know that no real time PS services can be supported in the current network, and that real time services including voice should be supported in the CS domain.

The MS 10 will, at receipt of this 200 OK message, remain registered with the currently used PS access domain but will deregister from all real time IMS services such as Multi Media Telephony (i.e. the MMTelAS server and other realtime IMS ASs) and perform a CS domain registration (normal location update). By doing this, other IMS services, such as Instant Messaging, Presence or Combinational services remain available and can be access simultaneously with CS services. When the MS 10 registers in the CS domain, the HSS 22 will update its data regarding the whereabouts of the MS 10, and to indicate that the MS 10 is in CS mode of operation for voice. The HSS 22 will also do a data transcript of supplementary services profiles relevant on IMS telephony to CS telephony, and send that information to the VMSC 32 (over Mobile Application Protocol) to allow as many IMS telephony services as possible to be carried over into the CS domain.

Figure 6:
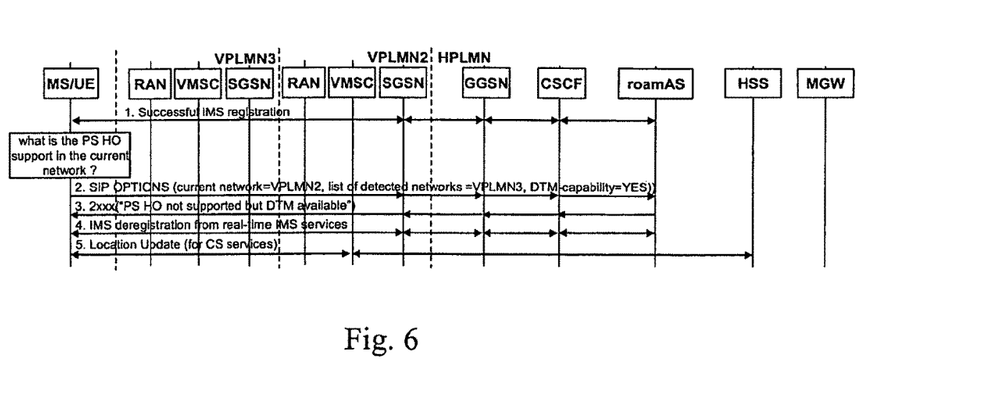
FIG. 6 is a signalling diagram illustrating signalling associated with registering with IMS, when no support for real-time PS services is available in the currently used network or in any of the detected networks but the current PLMN and the MS support.

Signalling associated with this procedure is illustrated in FIG. 6, where the current PS network is designated VPLMN2 and another detected network is designated VPLMN3.

iv. The database 36 indicates no support for real time PS services in the current network or in any of the detected networks and simultaneous PS and CS support not available anywhere. [The lack of such support could be because the MS does not support simultaneous CS and PS sessions and/or that none of the detected networks or the current network support simultaneous CS and PS sessions.]

The roamAS 30 will respond with a 200 OK message containing "no PS HO supported" (or similar). The MS 10 will, at receipt of the SIP message, deregister itself from the real-time IMS services (i.e. the MMTelAS server and other realtime IMS ASs) and perform a CS domain registration (normal location update). The MS now knows that combinational services are not possible and that sessions can be only in CS domain or only PS domain, where CS normally has precedence over PS. Data transcription may again be performed in order to provide supplementary services profiles to the VMSC.

Figure 7:
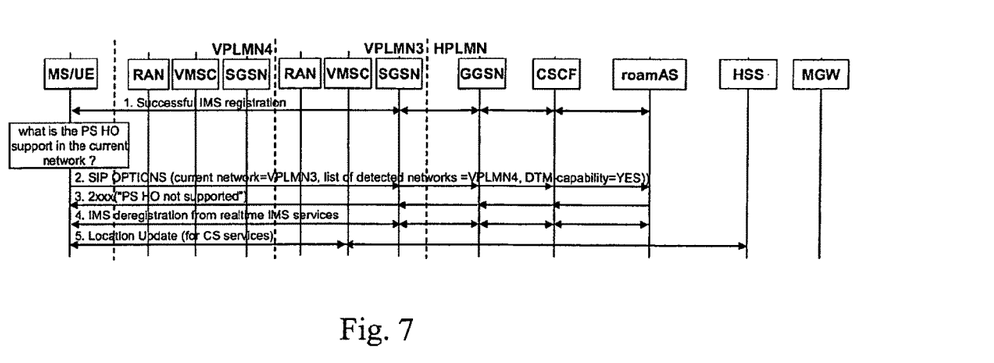
FIG. 7 is a signalling diagram illustrating signalling associated with registering with an IMS, when no support for real-time PS services is available in the currently used network or in any of the detected networks and support for simultaneous CS and PS sessions is not available anywhere.

Signalling associated with this procedure is illustrated in FIG. 7, where the current visited PS access domain is designated VPLMN3, and an alternative network is designated VPLMN4.

v. The information contained in the database 36 indicates "no support for real time PS services in the current network or in any of the detected networks" and "no simultaneous CS and PS session support in the current network", but indicates that one of the (other) detected networks and the MS support simultaneous CS and PS sessions.

The roamAS 30 will respond with a 200 OK SIP response message containing "PS HO not supported, but simultaneous CS and PS sessions available in an alternative PLMN". The MS 10 will, at receipt of the 200 OK message, deregister from the IMS, detach from the current PLMN, attach to the alternative PLMN in PS domain, register for non real-time services in IMS, and perform a CS domain registration (attach or normal location update). By doing this, other IMS services such as Instant Messaging, Presence, etc. can be supported in the alternative PLMN. Again, a data transcription step may be performed to update the VMSC with the required supplementary services profiles.

Figure 8:
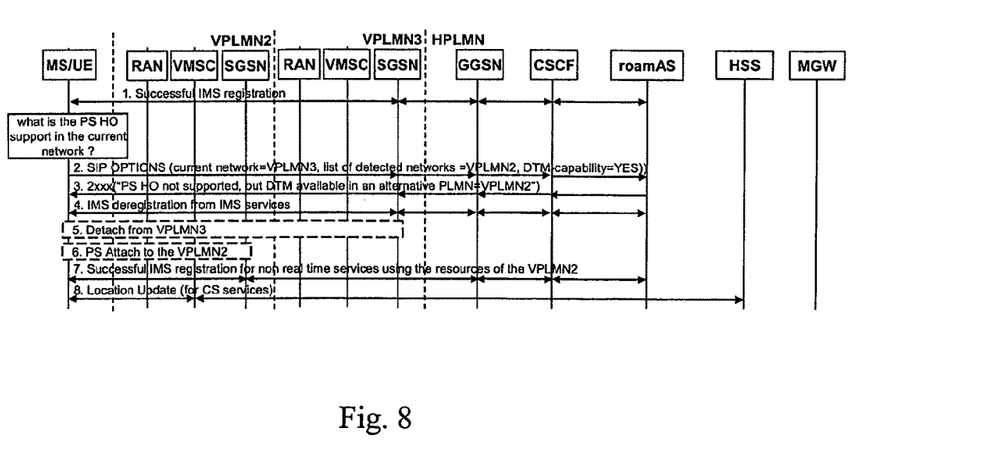
FIG. 8 is a signalling diagram illustrating signalling associated with registering with IMS, when no support for real-time PS services is available in the currently used network or in any of the detected networks and there is no support for simultaneous CS and PS sessions in the currently used network but one of the detected networks and the MS supports simultaneous CS and PS sessions.

Signalling associated with this procedure is illustrated in FIG. 8, where the current PS access domain is designated VPLMN3, and an alternative network is designated VPLMN2.

Rather than perform the capability check following IMS registration, it may be preferable to do this at registration, in which case the necessary PS access domain identities (simultaneous CS and PS session capabilities, cell location, etc) may be included in the initial SIP REGISTER message. The 200 OK response returned by the roamAS contains the required information as discussed above.

The present invention also provides for the handling of terminating calls (i.e. incoming calls destined for the MS 10 in the IMS domain depending on a) which domains (i.e. CS and/or PS) the MS is currently registered at, b) the PS handover and simultaneous CS and PS session capabilities of the current network, c) simultaneous CS and PS session capabilities of the MS 10, and d) the type of the terminating call (for example, if it contains a voice component requiring real-time capabilities).

When the IMS receives a terminating call for the MS 10, the call request will enter the I-CSCF of the HPLMN 14, which will interrogate the HSS 22 to identify the location of the MS 10. If an S-CSCF is currently allocated to the MS 10, the HSS 22 will indicate this to the I-CSCF. Otherwise (i.e. if there is no currently allocated S-CSCF), the I-CSCF will select a default S-CSCF, and forward the call request to that S-CSCF. The S-CSCF receives all necessary data (including initial filter criteria) for the MS 10 by interrogating the HSS 22. This will lead to an MMTelAS instance being linked into the SIP path. If an S-CSCF and an MMTelAS 28 are already allocated, the I-CSCF routes the call to the S-CSCF and on to the MMTelAS. This represents standard IMS procedures for terminating a call.

Figure 9:
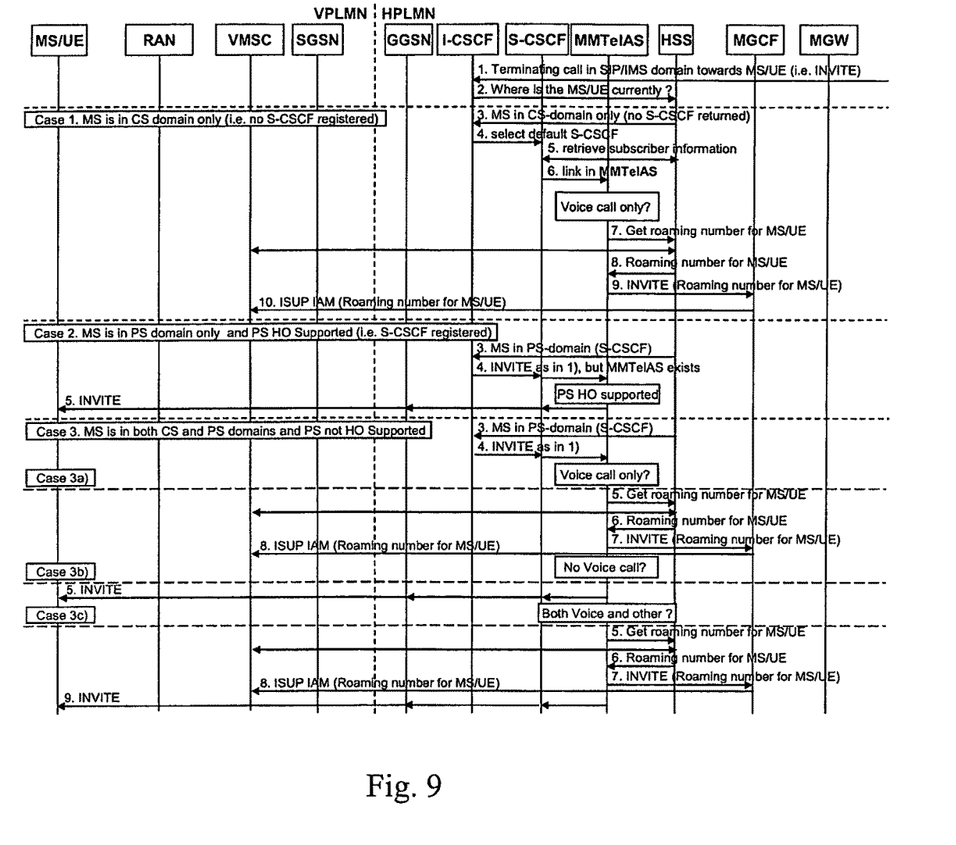
FIG. 9 is a signalling diagram illustrating signalling associated with terminating a call destined for the wireless terminal.

The sequences in FIG. 9 show the three different high-level cases that can take place when a terminating call is received in the IMS system. These three cases are:

Case 1) The MS 10 is only registered in the CS-domain

In this case, the HSS 22 returns to the I-CSCF that the MS 10 is not registered in the PS domain (step 3) and a default S-CSCF is therefore allocated for the MS 10 (step 4). The S-CSCF then requests subscriber information at the HSS 22 (step 5). This then results in a new MMTelAS 28 instance being linked into the call (step 6). In the example shown in FIG. 9, the MMTelAS 28 then checks the type of the terminating call and finds out that this is a voice call. Then the MMTelAS 28 requests a roaming number from the HSS 22 (step 7) and forwards the call to the MGC which connects to the CS network. The call will eventually be routed to the VMSC 32 in the VPLMN 12. Alternatively, the MMTelAS will not request a roaming number. Instead it derives or fetches the MSISDN of the called subscriber and forwards the call to the MGC. The MGC then forwards the call to a GMSC in the HPLMN 14 after which standard mobile call procedure apply.

Case 2) The MS 10 is registered in the IMS-domain (both in S-CSCF and in MMTelAS) and PS real-time services are supported in the currently used access domain 12

In case 2, the HSS 22 returns that the MS 10 is registered in IMS/PS domain (step 3) and the terminating call request is forwarded to the indicated S-CSCF. The S-CSCF then forwards the terminating call request to the existing MMTelAS 28 instance (step 4). As the MS is registered with the MMTelAS, the MMTelAS 28 knows that the MS 10 is currently in a visited access domain that supports PS real-time services and the terminating call request is forwarded to the MS 10 in the PS domain.

Case 3) The MS 10 is registered in both the CS and IMS-domains but PS real-time services are not supported in the currently used access domain 12 (i.e. the MS is not registered to the MMTelAS).

In case 3, the HSS 22 returns to the I-CSCF that the MS 10 is registered with a S-CSCF (step 3) and the terminating call request is forwarded to the indicated S-CSCF which then links in a new MMTelAS 28 instance (step 4) as described above (because the MS/UE was not previously registered with the MMTelAS). The MMTelAS 28 will then know about the CS domain registration or may check the HSS 22 to find out about this.

The next step is that the MMTelAS 28 checks the type of the terminating call and there are three different options and these are described as sub-cases 3*a*, 3*b* and 3*c*.

In the sub-case 3*a*, the terminating call is only a voice call. Then the MMTelAS 28 requests for a roaming number from the HSS 22 (step 5) and continues the call set-up towards the MGCF using the roaming number. Note also that the other possibility about identity mapping and forwarding the call to a GMSC via a MGC is not shown in this example.

In the sub-case 3*b*, the terminating call is not a voice call and can be forwarded to the MS in the PS domain (nb. All terminating calls in the IMS are delivered to the MMTelAS).

In the sub-case 3*c*, the terminating call comprises both a voice call and other elements. The voice call part is forwarded to the MS as in case 3*a* and the other additional elements are forwarded to the MS in the PS domain as in case 3*b* above.

It will be appreciated by persons skilled in the art that various modifications may be made to the above described embodiments without departing from the scope of the present invention. For example, the embodiment described above has assumed that a new application server (roamAS) is responsible for interpreting information provided by the database and for supplying the result to the MS. However, an alternative solution is for the MS to query the database directly, and for it to interpret the results prior to implementation.

The invention claimed is:

1. A method of selecting an access domain for sending information between a wireless terminal and a core network, wherein sessions between the wireless terminal and the core network are established and controlled using an IP Multimedia Subsystem (IMS), the method comprising:
   maintaining within the IMS, a database holding information on real-time packet-switched service capabilities of a plurality of access domains;
   at or in response to IMS registration of the wireless terminal, interrogating said database by an IMS node based upon information received from the wireless terminal identifying currently used or available access domains to retrieve capabilities information for the currently used or available access domains;
   sending the capabilities information for the currently used or available access domains from the IMS node to the wireless terminal;
   determining by the wireless terminal, whether a packet-switched access domain that supports packet-switched handover is available;
   when a packet-switched access domain that supports packet-switched handover is available, registering by the wireless terminal first with the available packet-switched access domain and second with the IMS; and
   when a packet-switched access domain that supports packet-switched handover is not available, roaming into an access domain having the best radio signal strength and initiating registration with the IMS.

2. The method according to claim 1, wherein said real time packet-switched service capabilities include a packet-switched handover capability.

3. The method according to claim 1, wherein said real time packet-switched service capabilities include a simultaneous circuit-switched and packet-switched session capability.

4. The method according to claim 1, further comprising sending a SIP REGISTER message by the terminal to the IMS identifying the packet switched domains available to the terminal.

5. The method according to claim 4, wherein the SIP REGISTER message identifies a current network and cell of the wireless terminal.

6. The method according to claim 5, wherein the SIP REGISTER message identifies the simultaneous circuit-switched and packet-switched session capabilities of the wireless terminal.

7. The method according to claim 1, wherein the interrogation is initiated subsequent to IMS registration of the terminal.

8. The method according to claim 7, further comprising sending a SIP OPTIONS message by the terminal to the IMS identifying the packet-switched domains available to the terminal.

9. The method according to claim 7, wherein the SIP OPTIONS message identifies a current location of the wireless terminal.

10. The method according to claim 8, wherein the SIP OPTIONS message identifies the simultaneous circuit-switched and packet-switched session capabilities of the wireless terminal.

11. The method according to claim 1, further comprising sending a SIP 200 OK response message from the core network to the wireless terminal indicating the selected access domain.

12. The method according to claim 1, wherein the IMS signals to the wireless terminal a requirement for the terminal to perform one of:
 remain registered to all IMS services via a current packet-switched access domain and not to register to a circuit-switched access domain;
 remain registered only for non-realtime IMS services in the current packet-switched access domain and to also register to a circuit-switched access domain; and
 register with another packet-switched access domain.

13. An application server for use in an IP Multimedia Subsystem (IMS), the application server comprising:
 a memory maintaining a database holding information on real-time packet-switched service capabilities of a plurality of access domains;
 input means configured to receive a SIP OPTIONS or SIP REGISTER message from a wireless terminal via another IMS server, at or in response to IMS registration of the wireless terminal, the message containing the identities of packet-switched access domains available to the wireless terminal; and
 output means configured to return to the wireless terminal via said other IP Multimedia Subsystem server, the capabilities of the identified access domains or a selected access domain;
 wherein when a packet-switched access domain that supports packet-switched handover is available, the application server sends an indication to the wireless terminal identifying the available packet-switched access domain that supports packet-switched handover, thereby causing the wireless terminal to register first with the available packet-switched access domain and second with the IMS; and
 wherein when a packet-switched access domain that supports packet-switched handover is not available, the application server sends an indication to the wireless terminal indicating there are no packet-switched access domains available that support packet-switched handover, thereby causing the wireless terminal to select an access domain having the best radio signal strength and initiate registration with the IMS.

14. A wireless terminal for use in a cellular network, wherein the terminal includes circuitry configured to:
 scan to identify available packet-switched access domains;
 register with an IP Multimedia Subsystem (IMS);
 send a notification to an IMS node at IMS registration or responsive thereto, the notification identifying the available packet-switched access domains;
 receive from the IMS node, a response to said notification, the response capabilities information for the identified packet-switched access domains;
 determine whether a packet-switched access domain that supports packet-switched handover is available;
 when a packet-switched access domain that supports packet-switched handover is available, register first with the available packet-switched access domain and second with the IMS; and
 when a packet-switched access domain that supports packet-switched handover is not available, roam into an access domain having the best radio signal strength and initiate registration with the IMS.

* * * * *